(12) United States Patent
Bartov et al.

(10) Patent No.: US 9,102,414 B2
(45) Date of Patent: Aug. 11, 2015

(54) HYDRAULIC MOTOR ASSEMBLY FOR AN AERIAL REFUELING SYSTEM

(75) Inventors: Asher Bartov, Los Angeles, CA (US); Charles Kubilos, Ventura, CA (US)

(73) Assignee: Federal Industries, Inc., El Segundo, CA (US)

( * ) Notice: Subject to any disclaimer, the term of this patent is extended or adjusted under 35 U.S.C. 154(b) by 550 days.

(21) Appl. No.: 13/597,002

(22) Filed: Aug. 28, 2012

(65) Prior Publication Data

US 2014/0064998 A1 Mar. 6, 2014

(51) Int. Cl.
*F16D 31/02* (2006.01)
*B64D 39/02* (2006.01)
*F16H 61/4043* (2010.01)
*F15B 21/04* (2006.01)
*F15B 13/02* (2006.01)

(52) U.S. Cl.
CPC .............. *B64D 39/02* (2013.01); *F15B 21/042* (2013.01); *F16H 61/4043* (2013.01); *F15B 13/024* (2013.01); *F15B 2211/20553* (2013.01); *F15B 2211/20569* (2013.01); *F15B 2211/40546* (2013.01); *F15B 2211/50518* (2013.01); *F15B 2211/528* (2013.01); *F15B 2211/61* (2013.01); *F15B 2211/62* (2013.01); *F15B 2211/6303* (2013.01); *F15B 2211/6652* (2013.01); *F15B 2211/6656* (2013.01)

(58) Field of Classification Search
CPC . B64D 39/02; F16H 61/4035; F16H 61/4043; F16H 61/4052
USPC ........................... 60/468; 137/625.66, 625.69
See application file for complete search history.

(56) References Cited

U.S. PATENT DOCUMENTS

| 6,454,212 B1 | 9/2002 | Bartov | |
|---|---|---|---|
| 6,786,455 B1 * | 9/2004 | Bartov | ...................... 244/135 A |
| 6,866,228 B2 | 3/2005 | Bartov | |

OTHER PUBLICATIONS

Fluid Power Handbook & Directory, "Hydraulic pumps", (1998/1999), A/119-A/127.

* cited by examiner

*Primary Examiner* — Michael Leslie
(74) *Attorney, Agent, or Firm* — Blakely Sokoloff Taylor & Zafman LLP

(57) ABSTRACT

Apparatuses and systems that use a variable displacement motor-pump (VDMP) to control the position and speed of a hose for an aerial refueling system are disclosed. At displacements greater than required to hold a position of the hose, the VDMP operates in a motor mode to retract the hose. For lesser displacements, the VDMP operates in a pump mode to control extension of the hose. In accordance with some embodiments, a pump-motor relief valve operates to throttle hydraulic fluid flow from the VDMP and to control mixing of hydraulic fluid flowing from the VDMP with system hydraulic fluid.

17 Claims, 7 Drawing Sheets

HYDRAULIC MOTOR ASSEMBLY FOR AN AERIAL REFUELING SYSTEM

BACKGROUND

Aerial refueling of a receiver aircraft from a tanker aircraft is commonly performed. Nevertheless, aerial refueling is still a difficult and dangerous maneuver that is typically attempted only by military personnel throughout the world. Today, usually only two types of aerial refueling systems are used: extendable boom systems and a hose-and-drogue systems.

In a hose-and-drogue system, the drogue is attached to the outlet end of a hose. The inlet end of the hose is attached to a hose reel onto which the hose is wound. The hose reel is typically mounted either within a tanker aircraft fuselage or on a refueling pod or module which is attached to the bottom of the tanker aircraft. The hose reel is commonly connected to a motor and/or pump that is hydraulically driven. The hydraulic motor-pump can be connected through a coupling system, which may include, e.g., various gear boxes, shafts, and couplings. When the hose is deployed from the tanker aircraft, the drogue encounters drag and the hose reel rotates in a trail direction in which the hose extends behind the tanker aircraft.

When the hose and the drogue are fully extended, a pilot of a receiver aircraft maneuvers the receiver aircraft to engage a refueling probe of the receiver aircraft with the drogue. Danger arises because the high speeds of the aircrafts relative to the ground and to each other can result in the drogue being hit with considerable force during engagement. Such engagements may create slack in the hose that must be quickly eliminated. Otherwise, the risk of aircraft accidents increases substantially. Retracting the hose onto the hose reel eliminates the slack.

After the drogue is engaged, fuel can be pumped from the tanker aircraft to the receiver aircraft. When refueling is completed, the pilot of the receiver aircraft disengages the refueling probe from the drogue. The hose can then be retracted onto the hose reel for storage by rotating the hose reel in a retract direction.

Thus, when the hose extends, it drives the hose reel in a trail direction while the hydraulic motor-pump operates in a pump mode. Conversely, operating the hydraulic motor-pump in a motor mode rotates the hose reel in the retract direction, causing the hose to be retracted onto the hose reel. In the trail mode, hose position can be controlled independently from variations in hose tension. In the retract mode, hose tension can be controlled independently from variations in hose position.

Aerial refueling systems have utilized hydraulic motor-pumps that incorporate fixed displacement hydraulic motors that control the extension of the hose in a pump mode and control the retraction of the hose in a motor mode. However, such systems suffer from low hose retraction rates and accessory components that increase overall weight and response time of the system. Information relevant to attempts to address these problems can be found in U.S. Pat. Nos. 6,454,212 and 6,866,228, which disclose variable displacement hydraulic motor-controlled hose reel drive systems.

SUMMARY OF THE DESCRIPTION

Embodiments generally provide apparatuses and systems that regulate the output of a variable displacement motor-pump (VDMP) by varying the VDMP displacement, with relatively constant system pressure. Embodiments also generally provide apparatuses and systems that control the mixing of hydraulic fluid recirculating to a VDMP in, for example, an aerial refueling system while the VDMP operates in a pump mode.

One embodiment relates to a hydraulic motor assembly (HMA). The embodiment is described in relation to its use in an aerial refueling system, but it will be appreciated that it may also be used in other hydraulic systems and applications. The HMA can include a supply conduit for conveying hydraulic fluid from an aircraft hydraulic system, a return conduit for conveying hydraulic fluid back to the aircraft hydraulic system, and a pump conduit for conveying hydraulic fluid between the supply conduit and the return conduit. The HMA can also include a valve, such as a check valve, that includes an inlet connected to the supply conduit and an outlet connected to the pump conduit. The valve can isolate the pump conduit and allow independent metering of the supply conduit to the return conduit. The HMA can also include a VDMP having a first port connected to the return conduit, a second port connected to the pump conduit, and a spline shaft connected to a hose reel of the aerial refueling system. The VDMP can be capable of operating in a pump mode in which hydraulic fluid is conveyed through the VDMP from the first port to second port, i.e., in which hydraulic fluid flows from the return conduit to the pump conduit, when the hose reel rotates in a trail direction. The VDMP can also be operated in a motor mode in which hydraulic fluid is conveyed through the VDMP from the second port to the first port, i.e., in which hydraulic fluid flows from the pump conduit to the return conduit, to rotate the hose reel in a retract direction.

The HMA can also include a pump-motor relief valve (PMRV) which has a dual function. The primary function is to limit the VDMP output pressure by opening a throttling orifice which connects the VDMP output, e.g., the pump conduit, to the return conduit. In this way, energy generated by an extending hose and hose reel rotating in the extend direction is dissipated by the pressure drop across the orifice. The second function is to mix enough aircraft hydraulic system fluid with the hydraulic fluid from the VDMP to limit the combined fluid temperature to a safe level for recirculation to the system.

The PMRV can include a control chamber and a mixing chamber. The control chamber can be divided into an actuator chamber and a regulation chamber by a spool. The actuator chamber can be placed in fluid communication with an inlet conduit and can also house a bias spring, or a portion thereof, configured to exert a load on the spool. The regulation chamber can be placed in fluid communication with the pump conduit. The mixing chamber can be placed in fluid communication with the supply conduit, the pump conduit, and the return conduit and can also house a portion of the spool. The mixing chamber can be separated from the control chamber by the spool, or by another structure, and can be configured to control mixing of hydraulic fluid flowing from the supply conduit and the pump conduit through the mixing chamber into the return conduit when the VDMP operates in the pump mode. Furthermore, the spool can be configured to prevent hydraulic fluid from flowing through the mixing chamber into the return conduit when the VDMP operates in the motor mode.

In an aspect of an embodiment, the bias spring regulates a pressure of hydraulic fluid in the pump conduit to a load pressure when the VDMP operates in the pump mode. Such regulation can regulate the pressure of the hydraulic fluid in the pump conduit to an absolute value or to a predetermined offset pressure above or below a pressure of hydraulic fluid in the supply conduit, return conduit, or another conduit of the conduit system. Thus, the VDMP of the aerial refueling system remains consistently loaded while the VDMP operates in the pump mode.

In an aspect of an embodiment, the spool is further configured to control mixing of hydraulic fluid flowing from the supply conduit and the pump conduit at a predetermined ratio when the VDMP operates in the pump mode. Such controlled mixing can mix hydraulic fluid flowing across a throttling orifice from the pump conduit with cooler hydraulic fluid flowing from the supply conduit to maintain the hydraulic fluid recirculating to the VDMP of the aerial refueling system at a constant temperature while the VDMP operates in the pump mode.

The above summary does not include an exhaustive list of all aspects of the present invention. It is contemplated that the invention includes all systems and methods that can be practiced from all suitable combinations of the various aspects summarized above, and also those disclosed in the detailed description below.

BRIEF DESCRIPTION OF THE DRAWINGS

The present invention is illustrated by way of example and not limitation in the figures of the accompanying drawings in which like references indicate similar, but not necessarily identical, elements.

DETAILED DESCRIPTION

Various embodiments and aspects will be described with reference to details discussed below, and the accompanying drawings will illustrate the various embodiments. The following description and drawings are illustrative and are not to be construed as limiting the invention. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with an embodiment can be included in at least one embodiment. In addition, the appearances of the phrase "in one embodiment" in various places in the specification do not necessarily all refer to the same embodiment.

Figure 1:
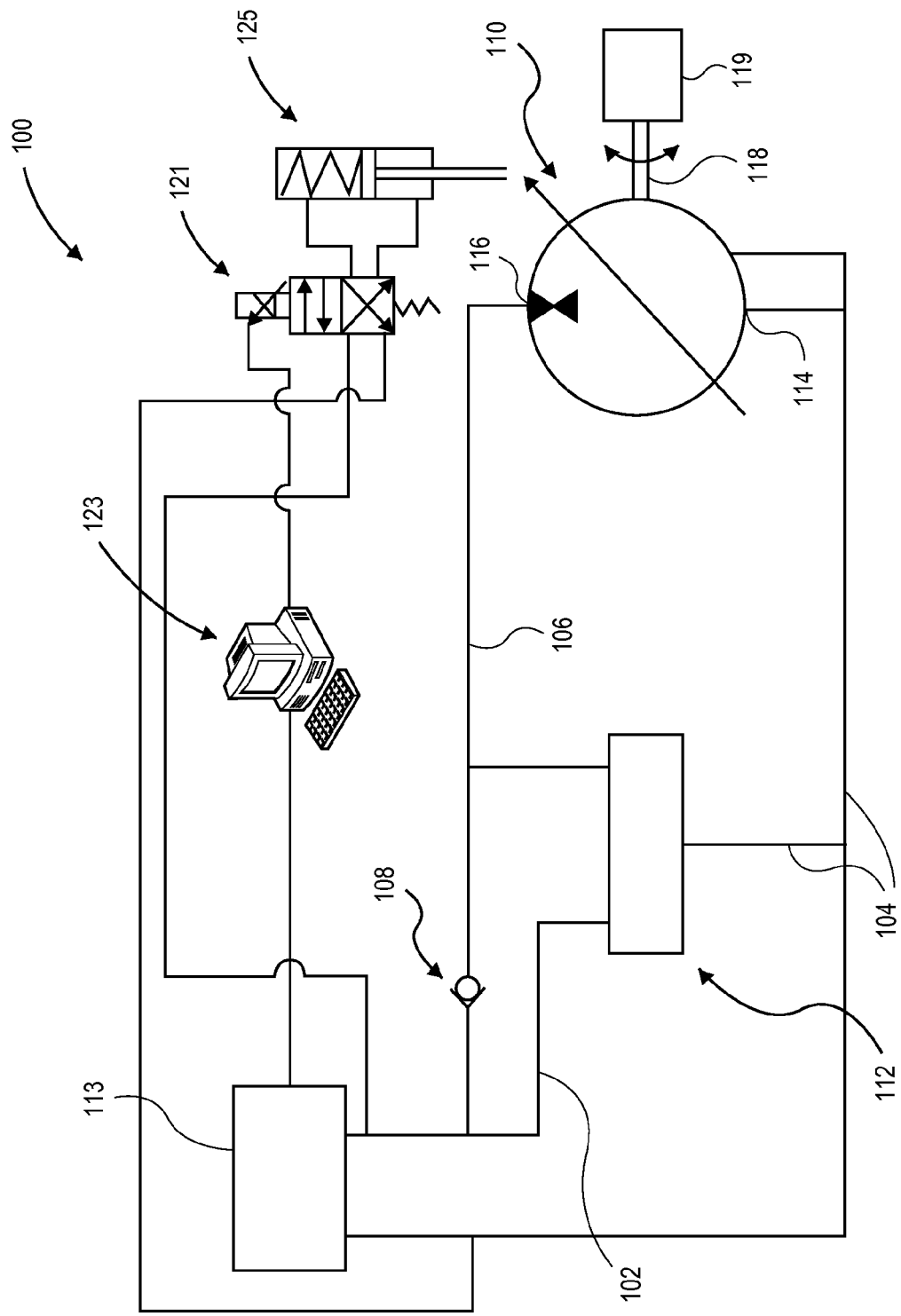
FIG. 1 is a schematic view illustration of a hydraulic motor assembly in accordance with an embodiment.

Referring to FIG. 1, a schematic view illustration of hydraulic motor assembly (HMA) 100 in accordance with an embodiment is shown. HMA 100 includes a conduit system to interconnect various components of HMA 100 through various conduits, such as supply conduit 102, return conduit 104, and pump conduit 106. For example, HMA 100 includes valve 108 disposed between supply conduit 102 and pump conduit 106 of the conduit system. Furthermore, HMA 100 includes variable displacement motor-pump (VDMP) 110 that connects with one or more other conduits of the conduit system. HMA 100 also includes pump-motor relief valve (PMRV) 112 that connects with several of the conduits of the conduit system.

Supply conduit 102 can convey hydraulic fluid from aircraft hydraulic system 113 to HMA 100 through a series of hydraulic pumps, valves, fittings, conduits, etc. This series of fluid pathways can originate in aircraft hydraulic system 113 reservoir, and can be duplicated in whole or in part to create redundant aircraft hydraulic systems that ensure supply of hydraulic fluid to supply conduit 102 in the event of a failed sub-system, e.g., a failed pump or valve.

Return conduit 104 can return hydraulic fluid from HMA 100 to aircraft hydraulic system 113. Hydraulic fluid can be conveyed from return conduit 104 to the reservoir of aircraft hydraulic system 113 through a series of hydraulic pumps, valves, fittings, conduits, etc. similar or different from the series described above with respect to supply conduit 102.

Pump conduit 106 can convey hydraulic fluid between supply conduit 102 and return conduit 104. The conveyance of hydraulic fluid between supply conduit 102 and return conduit 104 need not be between the same two points. Depending on the mode in which HMA 100 is operating, the direction and or path that hydraulic fluid flows through pump conduit 106 may vary. For example, when HMA 100 is operating with VDMP 110 in a motor mode, pump conduit 106 may convey hydraulic fluid directly from supply conduit 102 to return conduit 104 through valve 108 and VDMP 110. In contrast, when HMA 100 is operating with VDMP 110 in pump mode, flow in pump conduit 106 is reversed and must be routed through PMRV 112 to return conduit 104. Simultaneously, flow from the aircraft hydraulic system 113 in supply conduit 102 proportional to flow from pump conduit 106 is routed to return conduit 104. The VDMP 110 flow and aircraft hydraulic system 113 flow are thoroughly mixed in PMRV 112, cooling the hydraulic fluid which is recirculated to first port 114 of VDMP 110. Mixed hydraulic fluid from PMRV 112 also returns to aircraft hydraulic system 113, and excess energy can be returned to aircraft hydraulic system 113 by this warmer fluid.

The conduit system described in reference to HMA 100 in FIG. 1 can include other conduits as well. For example, in at least one embodiment, an inlet conduit is connected with PMRV 112. The inlet conduit may be the same or different than any of the other conduits. In other words, the inlet conduit can be connected to the same source or fluid pathway of another conduit, e.g., supply conduit 102, with minimal resistance to fluid flow therebetween. Thus, a conduit as used herein refers generally to a fluid pathway, such as a fluid pathway that exists between two components of HMA 100. Therefore, any conduit may be composed of one or more tubes, hoses, fittings, etc., that can create a continuous fluid pathway between the components that the conduit is described as being connected with.

In various embodiments, the conduits of the conduit system can be rigid fluid lines, flexible hose, drilled passages in manifolds, or any communicating volumes in which the fluid is in a functionally equivalent state. More particularly, the various conduits may be rigid tubing fabricated from copper, aluminum alloy, steel, or titanium 3Al-2.5V alloy, as is commonly used in aircraft hydraulic systems. However, conduit selection may be based on considerations such as operating pressures, space limitations, and routing requirements through the aircraft body. Thus, one skilled in the art will appreciate that the conduits may be formed from various other known materials and forms that meet the design requirements of a particular case.

Referring again to FIG. 1, HMA 100 can include valve 108 connected to supply conduit 102 and pump conduit 106. Thus, hydraulic fluid can flow from supply conduit 102 through an inlet of valve 108 to pump conduit 106 through an outlet of valve 108. Valve 108 can operate to control the flow of hydraulic fluid through pump conduit 106. For example, opening valve 108 can allow hydraulic fluid to flow through pump conduit 106 to VDMP 110 when HMA 100 is operating with VDMP 110 in a motor mode. Alternatively, valve 108 can be closed when HMA 100 is operating with VDMP 110 in a pump mode in order to isolate pump conduit 106 from supply conduit 102 and thus allow independent metering of flow from supply conduit 102 and pump conduit 106 through PMRV 112.

In an embodiment, valve 108 is a check valve that allows hydraulic fluid to flow in only one direction, e.g., from the inlet to the outlet of valve 108. Thus, hydraulic fluid is allowed to flow into pump conduit 106 from supply conduit 102 through valve 108, but hydraulic fluid is not allowed to flow into supply conduit 102 from pump conduit 106 through valve 108. The flow of hydraulic fluid through valve 108 can therefore depend on the relative pressures of hydraulic fluid in supply conduit 102 and pump conduit 106. When a pressure of hydraulic fluid in supply conduit 102 exceeds a pressure of hydraulic fluid in pump conduit 106, hydraulic fluid will flow from supply conduit 102 to pump conduit 106 through valve 108. Conversely, when the pressure of hydraulic fluid in pump conduit 106 exceeds the pressure of hydraulic fluid in supply conduit 102, hydraulic fluid will be checked by valve 108 and will not flow from pump conduit 106 through valve 108.

In an alternative embodiment, valve 108 can be a valve type other than a check valve. For example, valve 108 can be a shuttle valve to allow for multiple inlets and directions of flow through valve 108. Alternatively, valve 108 can be a two-port valve that is electromechanically controlled and, in one embodiment, placed in communication with a separate flow sensor. In this way, valve 108 can rely on flow sensor information to control valve 108 and thereby emulate the operation of a check valve. It will be apparent to one skilled in the art that many other valve configurations may be used to achieve the functionality that is within the scope of this description. For example, in an embodiment described further below, PMRV 112 can include features that provide a check valve equivalent function.

Still referring to FIG. 1, in this embodiment, HMA 100 can include VDMP 110 that includes first port 114, second port 116, and spline shaft 118. First port 114 can be connected to return conduit 104 and second port 116 can be connected to pump conduit 106. Thus, when VDMP 110 operates in a pump mode, hydraulic fluid can be sucked from return conduit 104 through first port 114 and conveyed through VDMP 110 to second port 116 and into pump conduit 106. In contrast, when VDMP 110 operates in a motor mode, hydraulic fluid is conveyed from pump conduit 106 to return conduit 104 in an opposite manner.

VDMP 110 can include spline shaft 118 that is driven by, or drives, the internal mechanisms of VDMP 110. Without going into detail, as the internal mechanisms and functions of VDMP 110 will be known to one skilled in the art, VDMP 110 can comprise inner structures, e.g., pistons, piston mounting plates, etc., that facilitate the conversion of fluid energy into mechanical energy, and vice versa. More particularly, in the pump mode VDMP 110 will convert mechanical energy in spline shaft 118 into fluid energy in the hydraulic fluid of HMA 100. Conversely, in the motor mode, VDMP 110 will convert fluid energy of HMA 100 into mechanical energy in spline shaft 118.

Spline shaft 118 can be connected to hose reel 119 of the aerial refueling system through various gear boxes, shafts, and couplings, as is known in the art. Additionally, hose reel 119 can couple with a hose and drogue of the aerial refueling system. Thus, spline shaft 118 will rotate in opposite directions corresponding to the extension and retraction of the hose. More particularly, in the pump mode, spline shaft 118 will rotate in a direction corresponding to rotation of hose reel 119 in a trail direction and extension of the hose. Conversely, in the motor mode, spline shaft 118 will rotate in a direction corresponding to rotation of hose reel 119 in a retract direction causing retraction of the hose.

Thus, whether VDMP 110 operates in a pump or motor mode can be characterized by observing the net torque applied to spline shaft 118. The net torque is roughly equivalent to the torque applied to spline shaft 118 by the fluid energy in HMA 100 minus the torque applied to spline shaft 118 by hose reel 119. Thus, the net torque of spline shaft 118 can be considered positive when operating in a motor mode and negative when operating in a pump mode. One skilled in the art will appreciate that the torque at which VDMP 110 drives its spline shaft 118, i.e., the torque applied to spline shaft 118 by the fluid energy in HMA 100, can be controlled by an electro-hydraulic control valve 121. By way of summary description, the electro-hydraulic control valve 121 increases or decreases the pressure of hydraulic fluid within a spring-biased displacement control piston 125. The hydraulic pressure in control piston 125 causes that piston to move into a position corresponding to such pressure. The position of control piston 125 determines the displacement of VDMP 110, which in turn determines the torque applied to spline shaft 118 by the fluid energy at a given hydraulic pressure supplied to VDMP 110. Furthermore, it will be appreciated that the electro-hydraulic control valve 121 can be controlled by a microprocessor (e.g., as represented by computer 123) based, for example, on flight data and commands provided by, e.g., the pilot or the avionic equipment of the tanker aircraft.

When electro-hydraulic control valve 121 manages control piston 125 so that VDMP 110 displacement is zero, there is minimal torque transmitted to spline shaft 118 by fluid energy in VDMP 110. Essentially, spline shaft 118 is able to rotate freely under such conditions. Therefore, if the hose is deployed from the tanker aircraft fuselage, there would be negligible resistance torque to counteract the torque applied from hose reel 119 to spline shaft 118, and thus, spline shaft 118 would rotate freely and the hose would extend at a maximum rate. In this mode of operation, VDMP 110 can be described as operating in the "pump mode".

It will be appreciated that the HMA 100 is not a passive system, but is rather an actively controlled system, even when the net torque on the spline shaft is negative, i.e., when VDMP 110 is operating in the pump mode. More specifically, HMA 100 is a feedback positioning system whose primary function is to maintain tension on the refueling hose and thus can control torque applied to the spline shaft even when the hose is extending. The VDMP 110 is a constant pressure system in which the torque of the motor-pump is controlled by varying the displacement to maintain motor-pump shaft torque equal to the load torque. As stated above, the displacement is controlled by electro-hydraulic control valve 121, which operates control piston 125 in a feedback control loop. When HMA 100 controls the displacement (output torque) of VDMP 110 at a point that is greater than required to maintain the load, VDMP 110 acts as a motor and retracts the hose. It will be appreciated that satisfactory operation of the system requires various sensors and feedback loops not shown in the accompanying figures, and these sensors and feedback loops can be controlled by a microprocessor represented by computer 123.

Figure 2A:
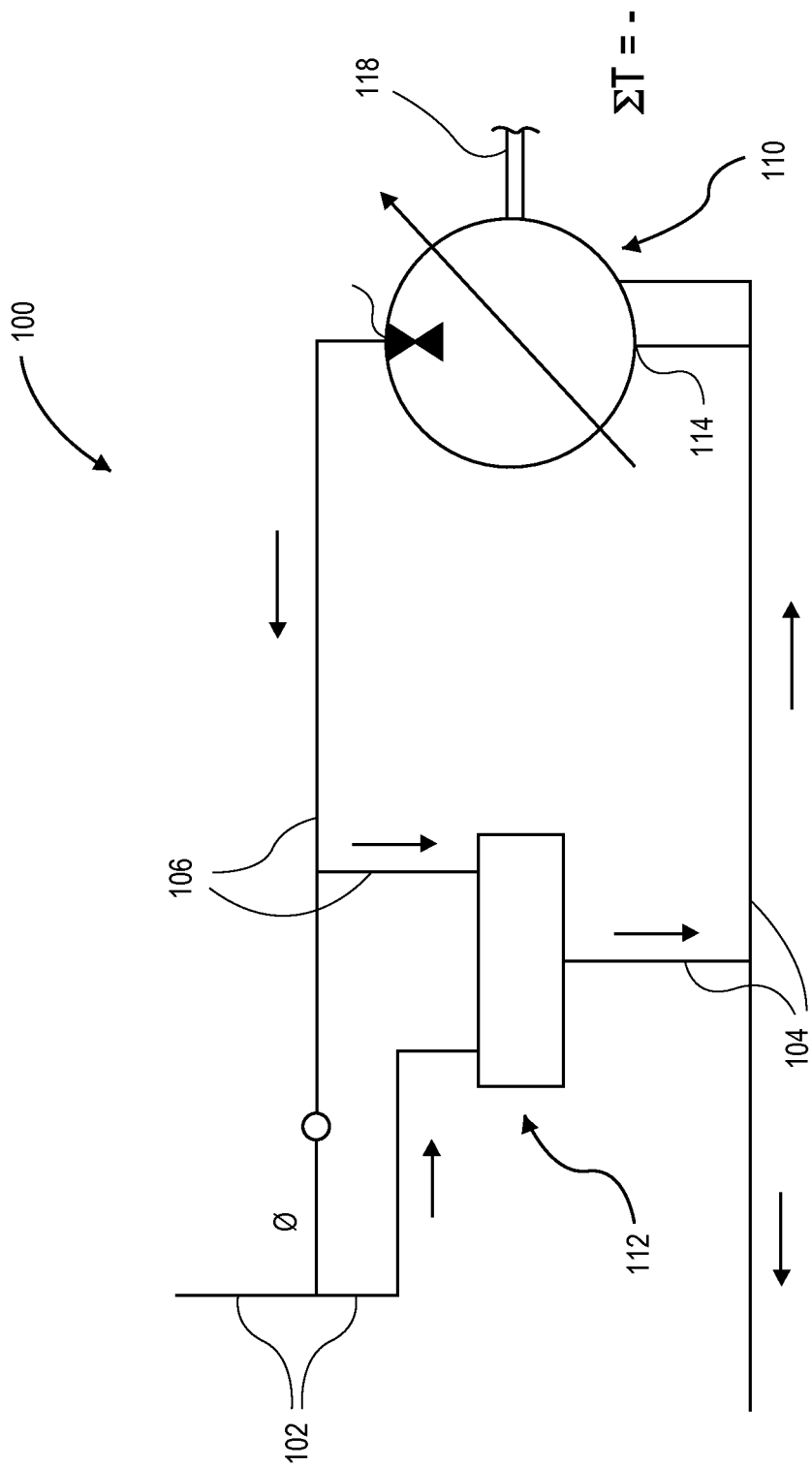
FIG. 2A is a schematic view illustration of a hydraulic motor assembly operating in a pump mode in accordance with an embodiment.

Referring to FIG. 2A, a schematic view illustration of HMA 100 is shown in accordance with an embodiment. This schematic illustrates the hydraulic fluid flow through HMA 100 while VDMP 110 operates in a pump mode. With VDMP 110 operating in this mode, the net torque on spline shaft 118 is negative, meaning that spline shaft 118 rotates in a direction consistent with the torque applied to hose reel 119 by the hose.

While VDMP 110 is operating in a pump mode, hydraulic fluid is recirculated through VDMP 110 from return conduit 104 to pump conduit 106. In this mode, the energy from VDMP 110 is dissipated across PMRV 112, where it is mixed with a proportional flow from aircraft hydraulic system 113 via supply conduit 102 to prevent overheating the fluid. Flow is discharged into return conduit 104 and recirculated to VDMP 110. In steady state, the portion that returns to VDMP 110 passes into pump conduit 106 at essentially the same temperature at which it entered VDMP 110 via return conduit 104.

In one aspect, the mixture of flow from VDMP 110 and aircraft hydraulic system 113 is mixed in PMRV 112. In PMRV 112, the flow from VDMP 110 in pump mode is mixed with aircraft hydraulic system fluid to cool it below the temperature of hydraulic fluid in return conduit 104. For example, as VDMP 110 fluid crosses throttling orifices in PMRV 112, it can be heated by about 21 degrees Fahrenheit, for phosphate ester fluid and 2900 psi differential across the throttling orifice. Therefore, the VDMP fluid is mixed with enough aircraft hydraulic system fluid to cool it by about 21 degrees Fahrenheit, leaving the temperature of the hydraulic fluid mixture entering the return conduit 104 approximately the same as VDMP fluid before it was pumped to PMRV 112.

Thus, the hydraulic fluid from VDMP 110 and aircraft supply system 113 are mixed within PMRV 112 before discharging into return conduit 104. It will also be appreciated that as the hydraulic fluid flows through return conduit 104, in order to maintain continuity of mass in the conduit system, a portion of the mixed hydraulic fluid can be diverted to aircraft hydraulic system 113 and a portion of the mixed hydraulic fluid can be returned to VDMP 110.

Figure 2B:
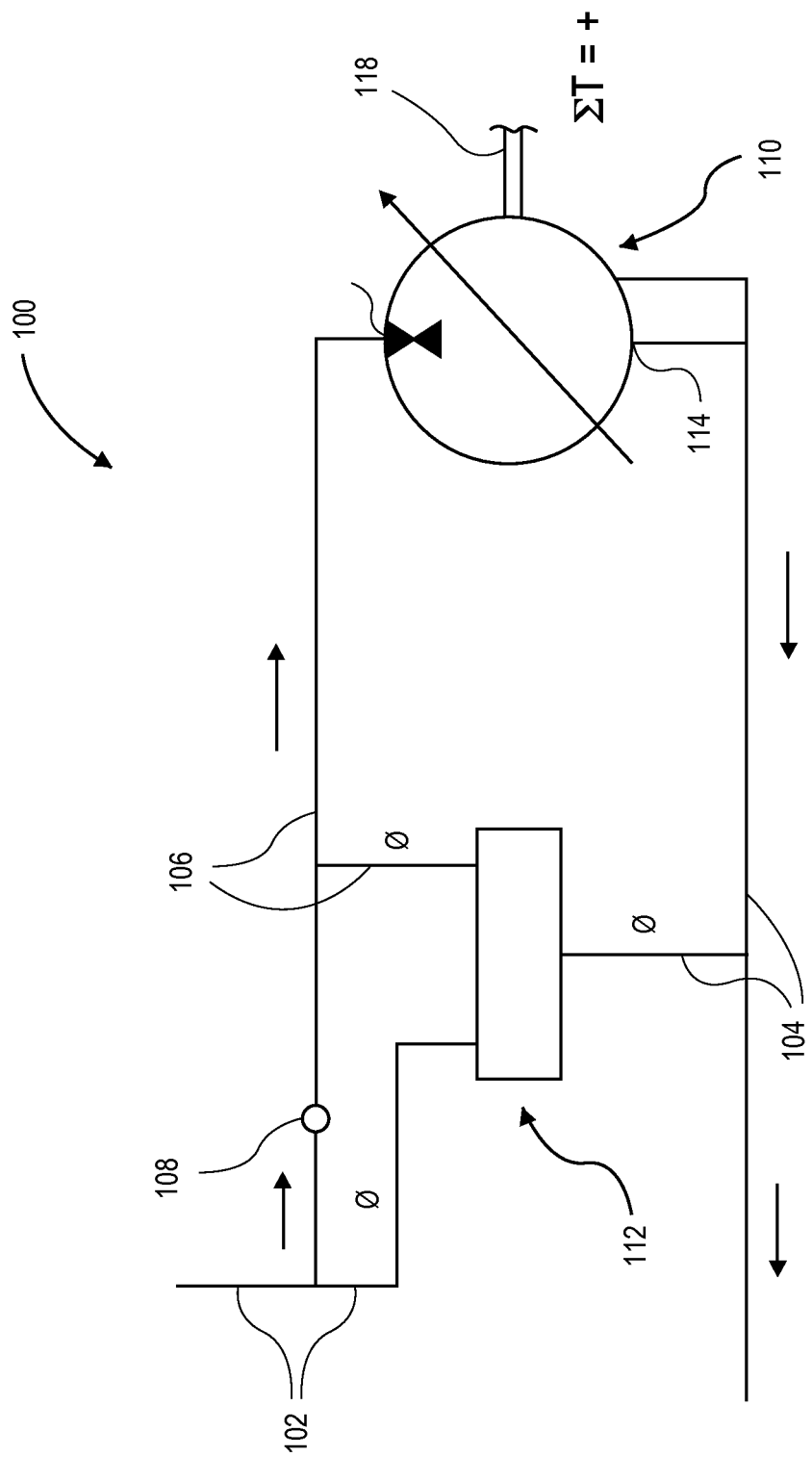
FIG. 2B is a schematic view illustration of a hydraulic motor assembly operating in a motor mode in accordance with an embodiment.

Referring to FIG. 2B, a schematic view illustration of HMA 100 is shown in accordance with an embodiment. This schematic illustrates a scenario of hydraulic fluid flow through HMA 100 while VDMP 110 operates in a "motor mode", as described above. More specifically, the feedback controlled HMA 100 can vary electro-hydraulic control valve 121 to control control piston 125 so that VDMP 110 displacement continues to increase. Assuming that VDMP 110 is properly sized for the application, the torque transmitted to spline shaft 118 by the fluid energy in VDMP 110 will increase beyond the torque applied to hose reel 119 by the extending hose. Thus, the net torque on spline shaft 118 will be positive, meaning that spline shaft 118 rotates in a direction that opposes the torque applied by the hose on hose reel 119. As a result, hose reel 119 will reverse its direction of rotation and the hose will be retracted onto hose reel 119. Again, this is a process that involves operation of the feedback controlled HMA 100 system using active system commands and various feedback loops.

While VDMP 110 is operating in a motor mode, hydraulic fluid is circulated from aircraft supply system 113 through valve 108 to pump conduit 106. Hydraulic fluid then flows through pump conduit 106 through VDMP 110. The hydraulic fluid drives VDMP 110 in motor mode to retract the hose, and returns to aircraft hydraulic system 113 via return conduit 104. In at least one embodiment, there is no flow through PMRV 112 in motor mode. Thus, there can be no hydraulic fluid flow in the lines leading to and from PMRV 112 while operating in the motor mode.

Building on the previous description, in pump mode the hydraulic fluid that flows from second port 116 can pass through some form of throttling orifice in PMRV 112 before it enters return conduit 104. From there it reenters VDMP 112 at first port 114 to complete the cycle. Since the total volume of fluid in the recirculating loop is small, the fluid temperature will quickly reach an intolerable level if the fluid is repeatedly passed through the throttling orifice. Excess heating may damage the fluid to the point of having to be replaced because it becomes corrosive, elastomer seals may be damaged or destroyed, and overheated fluid may present a fire danger. However, this can be avoided by a mechanism incorporated in HMA 100 for cooling the hydraulic fluid.

Figure 3:
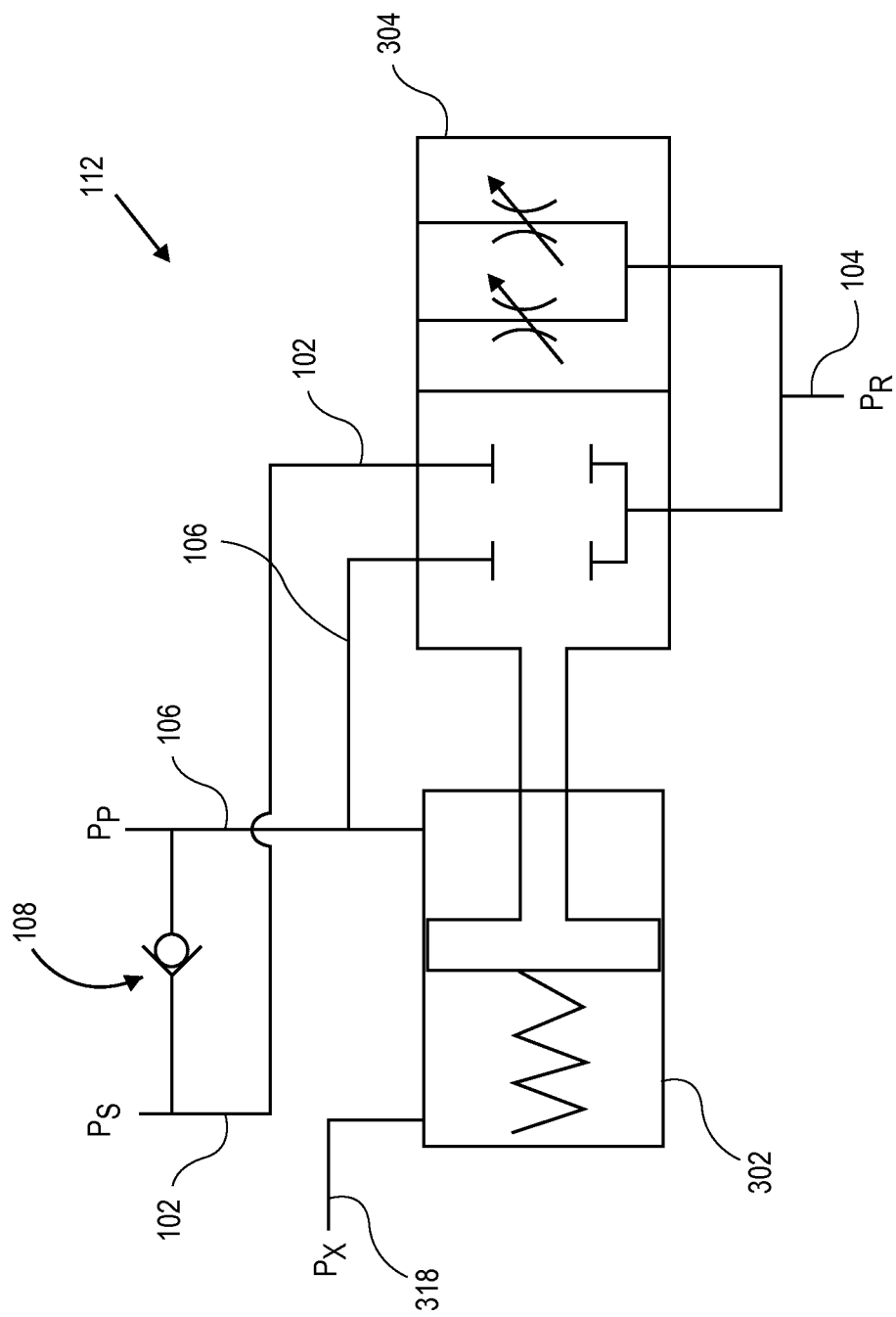
FIG. 3 is a schematic view illustration of a pump-motor relief valve in accordance with an embodiment.

To regulate load on VDMP 110 and cool hydraulic fluid in the pump mode, HMA 100 can include PMRV 112. Referring now to FIG. 3, a schematic view illustration of PMRV 112 is shown in accordance with an embodiment. In this embodiment, PMRV 112 can include control chamber 302 for regulating pressure in pump conduit 106 to load VDMP 110 operating in the pump mode. Control chamber 302 is fluidly connected with pump conduit 106 and inlet conduit 318. PMRV 112 also includes mixing chamber 304 that controls the mixing of hydraulic fluid flowing from supply conduit 102 and pump conduit 106 into return conduit 104 as the hydraulic fluid circulates through VDMP 110 operating in a pump mode. This controlled mixing can serve a cooling function to cool circulating hydraulic fluid in HMA 100.

Still referring to FIG. 3, mixing chamber 304 is connected with supply conduit 102, pump conduit 106, and return conduit 104. More particularly, mixing chamber 304 is represented schematically as a pair of connected flow control valves, such as relief valves, where each flow control valve is connected with one of either the supply conduit 102 or pump conduit 106. Moreover, flow of hydraulic fluid through the flow control valves is variable. This variation can be provided by the mechanical actuation of the valve orifices, e.g., by actuating a spool that is apposed with the orifices. Thus, flow from supply conduit 102 and the flow from pump conduit 106 are metered through the throttling orifices of mixing chamber 304. After passing through the orifices, the hydraulic fluid converges and mixes before entering return conduit 104. Although mixing chamber 304 has been shown schematically in FIG. 3, one skilled in the art will appreciate that numerous physical embodiments may be used to achieve the represented hydraulic flow pattern. Several such embodiments are described in detail below.

Figure 4:
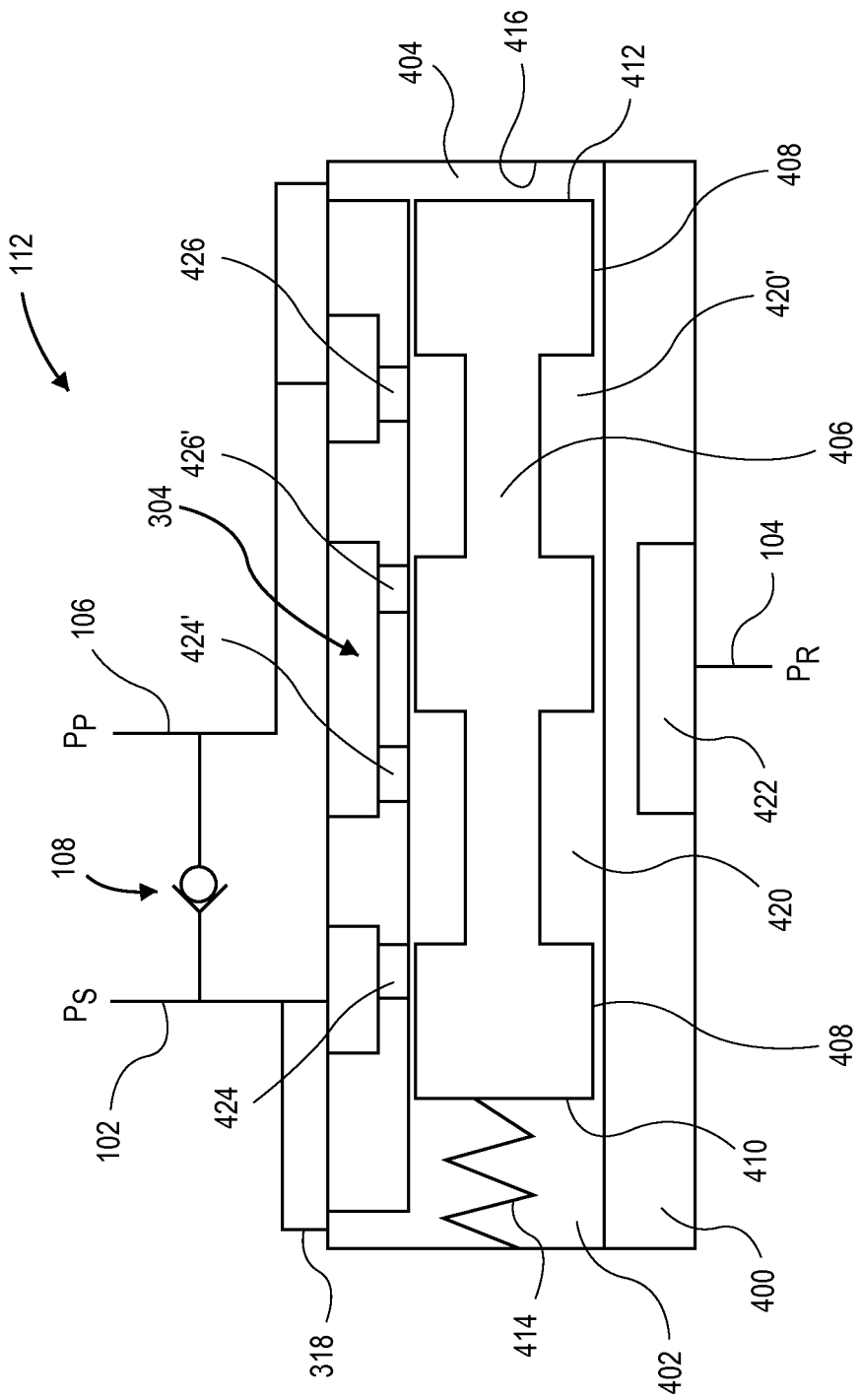
FIG. 4 is a schematic view illustration of a pump-motor relief valve in accordance with an embodiment.

Referring now to FIG. 4, a schematic view illustration of a pump-motor relief valve is shown in accordance with an embodiment. The PMRV 112 includes various spaces within a cylinder, such as within sleeve 400. Sleeve 400 can be physically combined or separated from the cylinders or other structures used to form PMRV 112 portions, such as control chamber 302 and mixing chamber 304. More specifically, sleeve 400 can be encased by a separate housing (not shown) and be sealed against the separate housing by various o-rings or other seals that allow the sleeve to move rotationally and axially within the housing.

Control chamber 302 includes actuator chamber 402 and regulation chamber 404. These chambers can be separated by spool 406. Control chamber 302 and its portions may be disposed within a cylinder, e.g., sleeve 400, that defines a chamber space within an inner wall of the cylinder. Alternatively, actuator chamber 402 and regulation chamber 404 can be disposed within entirely separate structures. For example, actuator chamber 402 may be disposed within a first cylinder and regulation chamber 404 may be disposed within a second cylinder. In such a case, the combination of the first cylinder and second cylinder could be considered to define control chamber 302, in accordance with at least one embodiment.

Spool 406 that separates actuator chamber 402 and regulation chamber 404 can be slidably disposed within sleeve 400. For example, spool 406 may include one or more landings 408 that slide along a surface of the inner wall of sleeve 400. In an alternative embodiment, spool landings 408 may further include grooves that constrain o-rings, and these o-rings can form a sliding seal with the inner wall of sleeve 400 in order to separate actuator chamber 402 and regulation chamber 404. In an embodiment, spool 406 includes first face 410 that is either directly or indirectly exposed to actuator chamber 402. Spool 406 can also include second face 412 that is either directly or indirectly exposed to regulation chamber 404. Thus, forces acting on first face 410 sum with forces acting on second face 412 to cause spool 406, or a portion thereof, to move within sleeve 400.

As shown in FIG. 4, in an embodiment, actuator chamber 402 further includes bias spring 414. For example, actuator chamber 402 may house a portion of a compression spring that has a first end and a second end. Whereas the first end of the compression spring can act on a surface of actuator chamber 402, a second end of the compression spring can act on first face 410 of spool 406. Thus, in the absence of any pressurized fluids applied to actuator chamber 402 or regulation chamber 404, spool 406 can be biased by the spring toward a mechanical stop 416. The mechanical stop 416 may simply be an end of control chamber 302 that spool 406 can slide against. However, in operation, with hydraulic fluid flowing through HMA 100 as VDMP 110 operates in the pump mode, spool 406 may operate in a floating condition with its position determined by the pressure difference across its faces.

In an embodiment, bias spring 414, e.g., as embodied by a compression spring, can have an inherent spring rate. For example, the compression spring could have a spring rate in the range of about 100 pounds per inch to about 500 pounds per inch. By way of example, the compression spring could have a spring rate of about 350 pounds per inch. One skilled in the art would appreciate that various other spring rates within or even outside of this range could be used within the scope of this description.

In an alternative embodiment, mechanical stop 416 can be positioned within actuator chamber 402, or it can exist in another structure of PMRV 112. Furthermore, the mechanical stop 416 can be adjustable, such that movement of mechanical stop 416 alters the range of motion of spool 406 within control chamber 302, or another chamber of PMRV 112. More particularly, mechanical stop 416 could be a steel shim that can be moved, or replaced by other steel shims having varying dimensions. Thus, the position of the mechanical stop 416 can be altered through adjustment.

In the embodiment shown in FIG. 4, actuator chamber 402 is connected with inlet conduit 318, which is in turn connected with supply conduit 102. Furthermore, regulation chamber 404 is connected with pump conduit 106. Thus, when hydraulic fluid is conveyed from supply conduit 102 to actuator chamber 402 and from pump conduit 106 to regulation chamber 404, a pressure differential may exist across first face 410 and second face 412 of spool 406. Accordingly, the hydraulic fluid pressure in actuator chamber 402 exerts a load on spool 406 in one direction and the hydraulic fluid pressure in regulation chamber 404 exerts a load on spool 406 in a direction. In at least one embodiment, these directions can be partially or directly opposite to one another.

Thus, in an embodiment, the position of spool 406 within PMRV 112 can depend upon the sum of the load exerted on first face 410 of spool 406 by bias spring 414, the load exerted on first face 410 of spool 406 by hydraulic fluid in actuator chamber 402, and the load exerted on second face 412 of spool 406 by hydraulic fluid in regulation chamber 404. Furthermore, unless spool 406 is biased against a mechanical stop 416, the pressure within regulation chamber 404 may be roughly equivalent to the pressure exerted on first face 410 by bias spring 414 and the hydraulic fluid in actuator chamber 402. In other words, the pressure of hydraulic fluid in regulation chamber 404 will be higher than the pressure of hydraulic fluid in supply conduit 102 by an offset pressure that is proportional to the load exerted by bias spring 414 on first face 410. This load will of course vary in some embodiments with the position of spool 406, since the movement of spool 406 may compress bias spring 414, which can exert a load proportional to its compression distance, as in the case of a compression spring.

Spool 406 can have various dimensions and features, such as landings, grooves, ports, protrusions, or any other features that enable the functionality described throughout this description. Dimensions can depend upon the overall system specifications and requirements. For example, it is contemplated that spool 406 diameter could be about 0.5 inches in an embodiment. However, spool 406 diameter could be in the range of about 0.1 inches to 2 inches in another embodiment. Even this range should not be considered restrictive, since spool 406 diameter could be any diameter that is necessary to regulate flow of hydraulic fluids in the system, consistent with the principles described herein.

Similarly, the motion of spool 406 or bias spring 414 can be selected and modified based on the principles of operation described throughout this description. For example, while in one embodiment, the stroke of spool 406 can be about 0.1 inches, it is also possible for the stroke of spool 406 to be several inches or more. Bias spring strokes can be similarly selected to meet the various operational and dimensional constraints of the system design.

Having discussed the basic interactions in control chamber 302, it will now be apparent that the pressure of hydraulic fluid within regulation chamber 404 can be regulated by adjusting the loads applied to first face 410. Thus, either the force applied through bias spring 414 or the pressure of hydraulic fluid from inlet conduit 318 can be adjusted in order to produce a corresponding change to the pressure of hydraulic fluid in regulation chamber 404. Since regulation chamber 404 and pump conduit 106 are connected together, the hydraulic fluid pressure in pump conduit 106 can be regulated in a similar manner.

Given that the pressure of hydraulic fluid in pump conduit 106 can be controlled using hydraulic fluid in inlet conduit 318 as an input, it will be appreciated that the hydraulic pressure in pump conduit 106 can be regulated to any desired pressure. For example, in one embodiment, the pressure in pump conduit 106 can be regulated to a predetermined absolute value. For example, if a pump conduit pressure of 3000 psi is desired and bias spring 414 exerts 100 psi across first face 410, inlet conduit 318 can be connected to a reservoir or other fluid source that supplies hydraulic fluid at 2900 psi in order to generate the desired pressure. It will be appreciated that the fluid source that is connected with inlet conduit 318 can be separate from any other fluid conduit or source in HMA 100, including supply conduit 102 that delivers hydraulic fluid from aircraft hydraulic system 113.

In an embodiment, pump conduit 106 pressure can be regulated to a predetermined offset pressure above the pressure of hydraulic fluid in supply conduit 102. By way of example, if bias spring 414 applies a load to first face 410 resulting in a 100 psi pressure distributed across the face surface area and the input conduit 318 is connected with supply conduit 102 to flow hydraulic fluid at a pressure of 2900 psi into actuator chamber 402, then when spool 406 is operating in a floating condition, the pressure of hydraulic fluid in regulation chamber 404 and pump conduit 106 would be regulated to 3000 psi, as exerted through second face 412 of spool 406. Notably, if the pressure of hydraulic fluid in supply conduit 102 drifts, for example, to 3100 psi, the pressure of hydraulic fluid in regulation chamber 404 and pump conduit 106 would be regulated to 4000 psi. Thus, the pressure in pump conduit 106 will always differ from supply conduit 102 by an offset pressure that is proportional to the load exerted by bias spring 414 on first face 410 while VDMP 110 operates in a pump mode.

In yet another embodiment, pump conduit 106 pressure can be regulated to a predetermined offset pressure above the pressure of hydraulic fluid in return conduit 104. By way of example, if bias spring 414 applies a load to first face 410 resulting in a 100 psi pressure distributed across the face surface area and the input conduit is connected with return conduit 104 to flow hydraulic fluid at a pressure of 2900 psi into actuator chamber 402, then when spool 406 is operating in a floating condition, the pressure of hydraulic fluid in regulation chamber 404 and pump conduit 106 would be regulated to 3000 psi, as exerted through second face 412 of spool 406. Notably, if the pressure of hydraulic fluid in return conduit 104 drifts, for example, to 3100 psi, the pressure of hydraulic fluid in regulation chamber 404 and pump conduit 106 would be regulated to 4000 psi. Thus, the pressure in pump conduit 106 will always differ from return conduit 104 by an offset pressure that is proportional to the load exerted by bias spring 414 on first face 410 while VDMP 110 operates in a pump mode.

In an alternative embodiment, the offset pressure can be below the pressure of hydraulic fluid in another conduit in the system. For example, bias spring 414 may be disposed within regulation chamber 404 instead of the actuation chamber 402. Thus, bias spring 414 can exert a load on second face 412 of spool 406. In this case, the pressure of hydraulic fluid within regulation chamber 404 will be offset below the pressure of hydraulic fluid within actuator chamber 402 by a pressure proportional to the load exerted by bias spring 414 on second face 412. For example, in the case where inlet conduit 318 is connected with an external reservoir, regulation chamber 404, and thus pump conduit 106, would be regulated to a pressure below the pressure of the external reservoir.

In yet another embodiment, inlet conduit 318 can be connected to a valve, such as a three-way valve, that would allow actuator chamber 402 to be connected to supply conduit 102, return conduit 104, or another system conduit or reservoir, depending on the preference of the pilot and/or avionics equipment of the tanker aircraft.

It will be appreciated that bias spring 414 may be embodied by various other actuator types and configurations. In an alternative embodiment, rather than being a compression spring, bias spring 414 could be a tension spring disposed within regulation chamber 404. The tension spring can pull second face 412 toward a wall of regulation chamber 404. Additionally, bias spring 414 may not be a spring at all. For example, bias spring 414 can be an electric motor, a pneumatic actuator, a hydraulic actuator, or any other mechanism or object that stores energy or exerts a load. Further still, bias spring 414 could be used in combination with various sensors, microprocessors, and controllers in order to exert a variable load on spool 406 based on pressures, flow rates, temperatures, and other characteristics that are monitored throughout the system. Control of bias spring 414 could be based on calculations involving such sensor data. Thus, numerous potential actuator configurations exist within the scope of this description.

In at least one embodiment, bias spring 414 may be adjustable in that adjustments may be made to bias spring 414 or PMRV 112 that result in a change to the load exerted on spool 406 by bias spring 414. For example, the load exerted by a compression spring actuator can be adjusted with a pressure adjusting screw (not shown) that changes the location of one end of the compression spring, and thus, changes the displacement of the compression spring when spool 406 is biased against a mechanical stop 416. That is, the preload of the spring may be adjusted. In one embodiment, the preload of a compression spring bias spring could be in the range of about 1 to 10 pound force. In another embodiment, the preload of a compression spring bias spring could be in the range of about 3 to 7 pound force. In yet another embodiment, the preload of a compression spring bias spring could be about 5 pound force. However, it will be appreciated that these ranges for spring preloads are not restrictive and that suitable spring preloads exist beyond these ranges.

Other means of adjusting bias spring 414 can be contemplated by one skilled in the art. For example, in the case where the bias spring is a hydraulic actuator, bias spring 414 could be controlled by varying the pressure applied to a hydraulic piston in bias spring 414. Alternatively, in the case of an electromechanical actuator, bias spring 414 could be controlled by varying the current supplied to a motor in bias spring 414. One skilled in the art can contemplate various other means of adjusting bias spring 414 within the scope of this description.

Still referring to FIG. 4, mixing chamber 304 can be in fluid communication with supply conduit 102, pump conduit 106, and return conduit 104. Mixing chamber 304 can include premix chambers 420, 420' and admix chamber 422. More particularly, supply conduit 102 can flow through a first orifice 424 formed in spool 400 into a premix chamber 420 and pump conduit 106 can flow through a second orifice 426 formed in spool 400 into a premix chamber 420'. These flows can subsequently enter into admix chamber 422 through a third orifice 424', also formed in spool 400, and a fourth orifice 426', also formed in spool 400. In an embodiment, premix chambers 420, 420' are defined by a space between the sleeve 400 inner wall and an outer surface of spool 406. Furthermore, the premix chambers 420, 420' can be separated from each other by one or more landings 408 of spool 406. The admix chamber 422 can be defined by an annular space formed within sleeve 400 or a space between sleeve 400 and an outer housing or encasement that sleeve 400 is disposed within. Thus, hydraulic fluid from supply conduit 102 can flow through first orifice 424, over a surface of spool 406 housed within premix chamber 420, and through third orifice 424' into admix chamber 422. Similarly, hydraulic fluid from pump conduit 106 can flow through second orifice 426, over a surface of spool 406 housed within premix chamber 420', and through third orifice 426' into admix chamber 422. Hydraulic fluid can exit mixing chamber 304 into return conduit 104 from admix chamber 422.

When hydraulic fluid from supply conduit 102 and pump conduit 106 enters admix chamber 422, it can be thoroughly mixed and cooled. For example, hydraulic fluid flowing from pump conduit 106 can be heated as it passes through second orifice 426 and or fourth orifice 426'. Thus, heating can result from the work done to force the hydraulic fluid through the orifice. However, upon entering admix chamber 422, it can be mixed with hydraulic fluid flowing from supply conduit 102, which is cooler. Hydraulic fluid from supply conduit 102 can be maintained at a cooler temperature, for example, by forcing it through larger orifices at lower rates or pressures. Thus, the temperature of the mixed hydraulic fluid will be less than one of the constituent hydraulic fluid parts.

The configuration of spool landings 408 and the orifices that connect the conduits with the various portions of mixing chamber 304 can control the flow of hydraulic fluid from the conduits through mixing chamber 304. More particularly, the flow control can depend on a position and size of the orifices formed in sleeve 400 and the relative locations of the spool landing surfaces. Thus, movement of spool 406 as managed by the control chamber in the manner described above will produce a corresponding movement of spool 406 within sleeve 400. More particularly, movement of spool 406 within sleeve 400 can cause spool landings 402 to interact with the sleeve orifices in such a way that the flow through supply conduit 102 and pump conduit 106 into mixing chamber 304 is varied. Even more particularly, the flow through the orifices depends on the dimensions of spool landings 402 and the position of spool 406 relative to first orifice 424, second orifice 426, third orifice 424', and fourth orifice 426' formed in spool 400.

By way of example, when VDMP 110 operates in a pump mode, spool 400 will be in a floating configuration as described above, with the pressure of hydraulic fluid in regulation chamber 404 being regulated to a pressure above or below the hydraulic fluid in actuator chamber 402. In this floating configuration, the landings 402 of spool 406 in sleeve 400 can either not obstruct, or only partially obstruct, the orifices that connect with supply conduit 102 and pump conduit 106. Thus, when VDMP 110 operates in a pump mode, hydraulic fluid will flow through mixing chamber 304 into return conduit 104.

In an alternative scenario of the same embodiment, when VDMP 110 operates in a motor mode, valve 108 of HMA 100 will open as the pressure in supply conduit 102 exceeds the pressure that is generated at the outlet, i.e., second port 116, of VDMP 110. Supply conduit 102 pressure exceeds the pressure in pump conduit 106 at this stage. As a result, valve 108 opens and hydraulic fluid from supply conduit 102 will flow into pump conduit 106. Thus, in the case where inlet conduit 318 of actuator chamber 402 is connected with supply conduit 102, the pressure of the hydraulic fluid in both actuator chamber 402 and regulation chamber 404, which is connected with pump conduit 106, will be equal. However, since bias spring 414 will exert an additional load on first face 410, spool 406 will be biased toward a mechanical stop 416.

Referring to FIG. 4, in the current example, spool 406 would be biased fully to the right. In this position, spool 406, or more particularly spool landings 408, can be configured to completely obstruct the flow of hydraulic fluid from the supply and pump conduits into PMRV 112. Thus, when VDMP 110 operates in a motor mode, PMRV 112 configuration can prevent hydraulic fluid from flowing through mixing chamber 304 into return conduit 104. It will be appreciated that this functionality improves the efficiency of the system because the hydraulic fluid conveyed through supply conduit 102 will be directed through VDMP 110 for generating torque in spline shaft 118, rather than leaking to return conduit 104 through PMRV 112 without doing beneficial work in HMA 100.

Having discussed the basic interactions inherent in mixing chamber 304, it will be appreciated that configuration of spool 406 and the placement and shape of the orifices within sleeve 400 can be modified in many ways to create the flow characteristics and mixing profiles that are desired in either the pump or motor mode. For example, spool 406 can be configured to control the flow of hydraulic fluid from supply conduit 102 and pump conduit 106 to facilitate the mixing of the hydraulic fluid from those sources at a predetermined ratio. By way of example, spool 406 can be configured to create a mixing ratio in the range of about one to three parts hydraulic fluid flowing from supply conduit 102 to every two to ten parts hydraulic fluid flowing from pump conduit 106. In an alternative example, spool 406 can be configured to create a mixing ratio of about one part hydraulic fluid flowing from supply conduit 102 to two parts hydraulic fluid flowing from pump conduit 106. It will be appreciated that this ratio can be varied such that more hydraulic fluid flows from supply conduit 102 than pump conduit 106, or such that the ratio of fluid flowing from those sources is much higher or lower.

In an embodiment, the predetermined ratio is achieved by maintaining a ratio of orifice sizes regardless of spool position. More particularly, the spool and orifices can be sized and positioned such that the area of the opening of first orifice 424 is a predetermined ratio of the area of the opening of second orifice 426. Any other orifices can be selected to create this predetermined ratio. For example, the ratio of area of openings in third orifice 424' and second orifice 426 could be used. As discussed above, the ratio of areas will correspond to the flow rates through the orifices, and thus maintain the area of the opening of third orifice 424' to be one half of the area of opening of fourth orifice 426' will result in a mixture of approximately one part supply hydraulic fluid to two parts pump hydraulic fluid. This is only an example and it will be appreciated that other ratios can be maintained within the scope of this description.

One skilled in the art will appreciate that a predetermined ratio can be closely maintained through precise fabrication of sleeve 400 and orifices 424, 424', 426, and 426'. For example, landing lengths, orifice sizes, and orifice shapes can be precisely machined as required. Furthermore, additional components can be used to sense system fluctuations and provide appropriate system inputs. By way of example, flow sensors could be used to monitor flow through pump conduit 106 and supply conduit 102 to ensure that the desired mixing ratio is being achieved. If the mixing ratio drifts from the predetermined ratio, inputs may be supplied to move spool 406, such as by regulating pressure that is supplied to inlet conduit 318, by adjusting a valve placed within supply conduit 102 or pump conduit 106, or any number of other system modifications that can be contemplated by one skilled in the art to achieve this goal.

Despite the preceding description, it should still be recognized that a precise predetermined ratio is difficult to achieve, and thus, this description is not intended to be so limited that the predetermined ratio is considered to be constant throughout the entire operation of HMA 100. In other words, although a predetermined ratio is contemplated in one embodiment, e.g., about one part to two parts flow, as the pressure in pump conduit 106 varies according to the variable displacement of VDMP 110, then the flow from pump conduit 106 will vary too. Therefore, the ratio of flow may fluctuate according to transient system responses such as these pressure and flow fluctuations. Therefore, any reference to a predetermined ratio should be considered to be approximate, in at least one embodiment.

Figure 5:
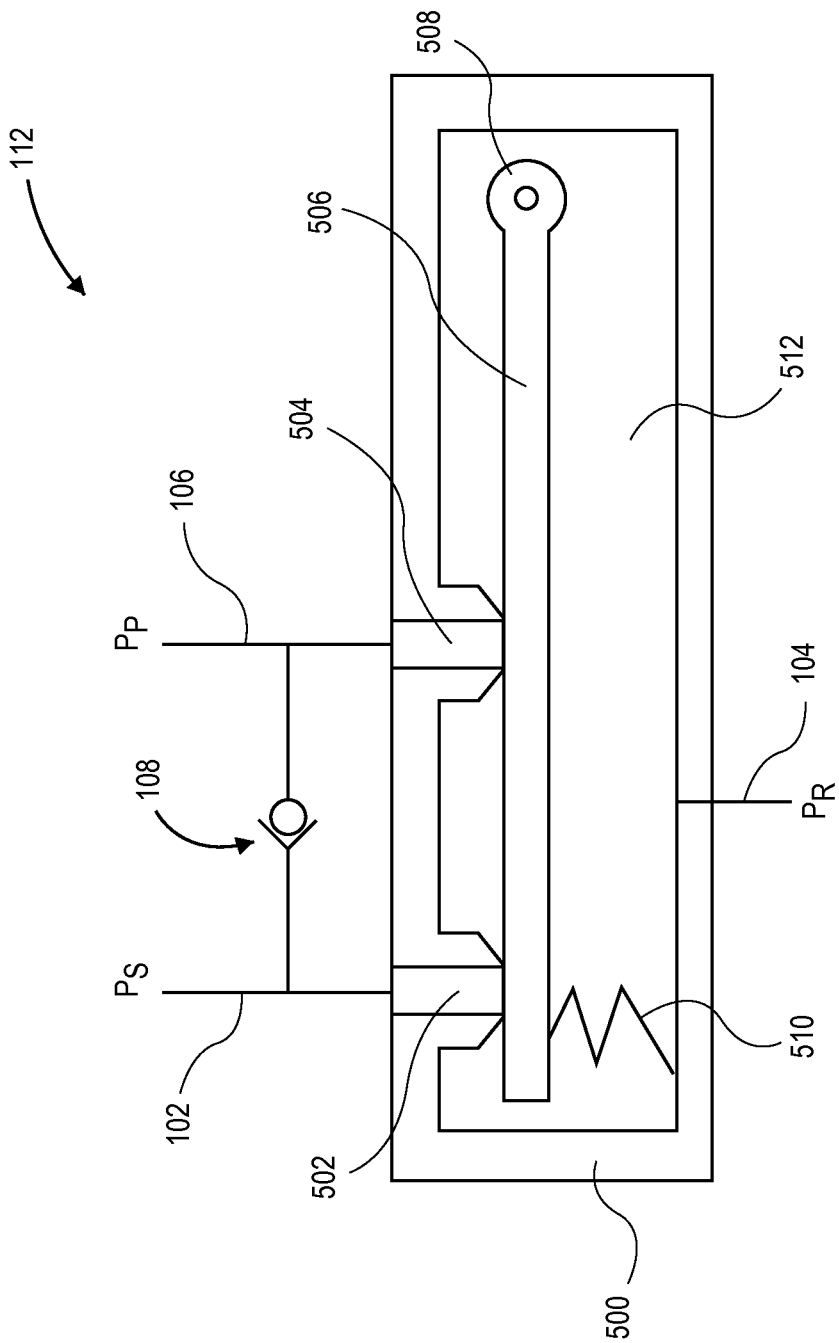
FIG. 5 is a schematic view illustration of a pump-motor relief valve in accordance with an embodiment.

Referring to FIG. 5, a schematic view illustration of a PMRV 112 is shown in accordance with yet another embodiment. A housing 500 can include features that emulate the control chamber and mixing chamber of the preceding embodiments. Housing 500 can include first orifice 502 connected with supply conduit 102 and second orifice 504 connected with pump conduit 106. Thus, when unobstructed, hydraulic fluid from each conduit can flow into mixing chamber 512 at a rate determined by the orifice dimensions, hydraulic fluid viscosities, pressures, etc.

In an embodiment, mixing of the hydraulic fluid is controlled by a stopper plate 506, which in one embodiment, is embodied by a bar having a width sufficient to occlude the orifices 502, 504. The stopper plate 506 can be hinged at pivot 508, using a clevis fastener, for example. Furthermore, stopper plate 506 can be biased in a closed direction by bias spring 510, which can be a compression spring, for example. The bias spring 510 can bias stopper plate 506 against the orifices, and thus, flow through the orifices will be stopped until the flow pressure through either orifice exceeds the bias force exerted on the stopper plate 506 by the bias spring 510.

When stopper plate 506 is open, i.e. when the pressure in the conduits exceeds the bias force, the flow of fluid through the orifices connecting with the supply and pump conduits may be unrestricted. Thus, the ratio of flow through these orifices will be based on the orifice flow characteristics and the pressures within the connected conduits, rather than upon any configuration of a spool landing. In essence, mixing chamber 512 operates as a simple orifice with mixing of the hydraulic fluid corresponding directly to the flow characteristics of the input orifices.

However, in an alternative scenario of the same embodiment, the stopper plate 506 can be configured to close off a portion or all of one orifice, while not restricting flow through another orifice. For example, the stopper plate 506 can be configured to slide from side to side, rather than being configured to rotate up and down relative to the orifices. In such an embodiment, as stopper plate 506 moves from being fully biased in a direction that blocks both orifices to being fully biased in another direction, e.g., as it moves from left to right in housing 500, it may first fully block both orifices, then not block the supply conduit orifice while partially blocking the pump conduit orifice, then not block either orifice. Thus, flow through mixing chamber 512 can be varied according to the mode of operation, i.e., motor mode or pump mode. The transition of stopper plate 506 through this range can be precisely controlled by adjusting orifice spacing, bias spring design, and so forth. This operation is consistent with the principles of operation described above.

Figure 6:
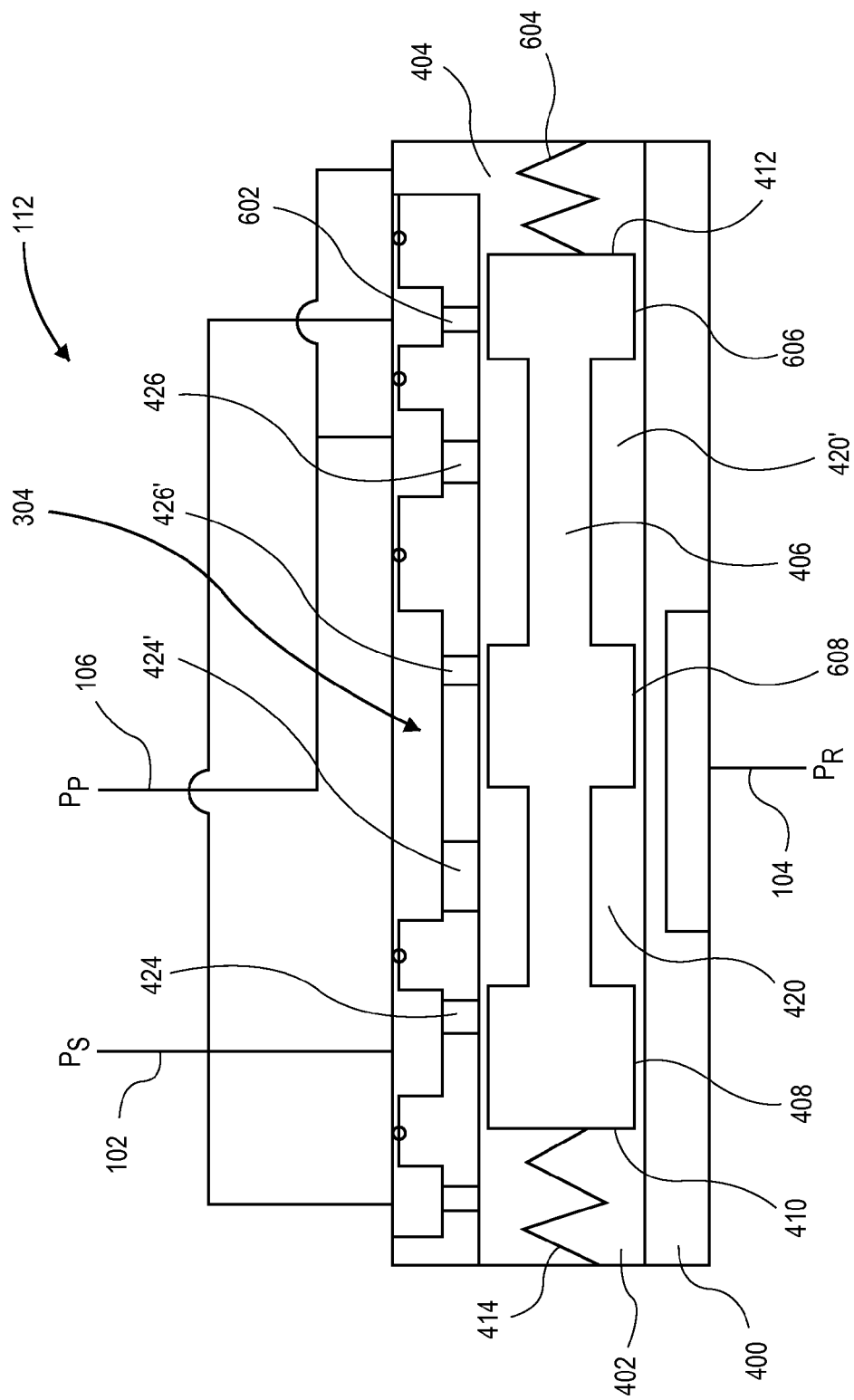
FIG. 6 is a schematic view illustration of a pump-motor relief valve in accordance with an embodiment.

Referring now to FIG. 6, a schematic view illustration of a pump-motor relief valve is shown in accordance with an embodiment. The structure of this embodiment is similar in some respects to that shown in PMRV 112 previously illustrated in FIG. 4. However, PMRV 112 embodiment shown here does not include external valve 108. Instead, external valve 108 is replaced in HMA 100 system by a functional equivalent integrated within PMRV 112. More specifically, PMRV 112 includes check orifice 602 formed within sleeve 400. As in the case of an external valve 108, check orifice 602 functions to permit flow from supply conduit 102 into pump conduit 106 when VDMP 110 operates in motor mode, but facilitates flow of hydraulic fluid from supply conduit 102 into mixing chamber 304 of PMRV 112 when VDMP 110 operates in a pump mode.

It will be appreciated that as in the embodiments described above, flow through check orifice 602 can depend on the interaction between check orifice 602 and a landing 408 of spool 406. More specifically, landing 408 and check orifice 602 can be precisely fabricated to ensure that hydraulic fluid from the supply conduit 102 connects to return conduit 104 when hydraulic fluid from the pump conduit 106 is at a higher pressure than hydraulic fluid from the supply conduit 102. Consistent with this objective, PMRV 112 also includes second bias spring 604 acting on second face 412.

Second bias spring 604 exerts a force on second face 412 that counteracts the force exerted on first face 410 by bias spring 414. Thus the position of spool 406 within sleeve 400 depends on the net load applied to it in actuator chamber 402 and the regulation chamber 404. The load applied in actuator chamber 402 is the sum of the pressure of hydraulic fluid from aircraft hydraulic system 113 across first face 410 and the load applied by bias spring 414 to first face 410. The load applied in regulation chamber 402 is the sum of the pressure of hydraulic fluid from pump conduit 106 across second face 412 and the load applied by second bias spring 604 to second face 412.

In an embodiment, the bias springs maintain spool 406 in a floating condition within sleeve 400. More particularly, as pressure of hydraulic fluid within pump conduit 106 increases, spool 406 will bias toward the left. However, as the pressure in pump conduit 106 decreases, spool 406 will bias toward the right.

In an embodiment, premix chamber 420' can be formed between landing 606 and 608 of spool 406. Furthermore, the landing size and spacing can be such that when spool 406 is biased leftward, a fluid pathway is created between first orifice 424 and third orifice 424', and between second orifice 426 and fourth orifice 426'. In contrast, when spool 406 is biased rightward, a fluid pathway is created between check orifice 602 and second orifice 426, while fluid flow through first orifice 424 is blocked. Thus, when spool 406 is biased leftward, hydraulic fluid flows from supply conduit 102 and pump conduit 106 to return conduit 104 through PMRV 112. In contrast, when spool 406 is biased rightward, hydraulic fluid flows from supply conduit 102 into pump conduit 106 through PMRV 112, but no fluid is returned to return conduit 104.

Thus, by sizing the bias springs, spool, and orifices appropriately, PMRV 112 provides a check valve equivalent function, in which hydraulic fluid is mixed within PMRV 112 when supply conduit 102 pressure is less than pump conduit 106 pressure, i.e., when VDMP 110 operates in a pump mode. Furthermore, PMRV 112 flows hydraulic fluid directly from supply conduit 102 to pump conduit 106 without mixing the fluid when supply conduit 102 pressure exceeds pump conduit 106 pressure, i.e., when VDMP 110 operates in a motor mode.

The various components of HMA 100 described above, as well as the subcomponents of those components, can be fabricated from materials that are commonly used in aircraft hydraulic systems. For example, in at least one embodiment, one or more components may be wholly or partially formed from material groups including copper, aluminum alloy, steel, or titanium 3Al-2.5V alloy. Furthermore, it will be appreciated by one skilled in the art that the various components can be designed with various shapes, profiles, and cross-sections to achieve the functionality described above. These various features and modifications have been omitted in some cases for the sake of brevity, but they are considered to be within the scope of the description.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A hydraulic motor assembly for an aerial refueling system, comprising:
   a supply conduit for conveying hydraulic fluid from an aircraft hydraulic system, a return conduit for conveying hydraulic fluid to the aircraft hydraulic system, and a pump conduit for conveying hydraulic fluid between the supply conduit and the return conduit;
   a valve comprising an inlet coupled to the supply conduit, and an outlet coupled to the pump conduit;
   a variable displacement motor-pump comprising a first port coupled to the return conduit, a second port coupled to the pump conduit, and a spline shaft coupled to a hose reel of an aerial refueling system, wherein the variable displacement motor-pump operates in a pump mode to convey hydraulic fluid from the first port to the second port when the hose reel rotates in a trail direction, and wherein the variable displacement motor-pump operates in a motor mode to convey hydraulic fluid from the second port to the first port when the hose reel rotates in a retract direction; and
   a pump-motor relief valve comprising:
      a control chamber divided into an actuator chamber and a regulation chamber by a spool having a first face and a second face, the actuator chamber being in fluid communication with an inlet conduit and housing a bias spring configured to exert a load on the first face, the regulation chamber being in fluid communication with the pump conduit; and
      a mixing chamber being in fluid communication with the supply conduit, the pump conduit, and the return conduit and housing a portion of the spool, the spool separating the mixing chamber from the control chamber, wherein the spool is configured to control mixing of hydraulic fluid flowing from the supply conduit and the pump conduit through the mixing chamber into the return conduit when the variable displacement motor-pump operates in the pump mode, and wherein the spool is configured to prevent hydraulic fluid from flowing through the mixing chamber into the return conduit when the variable displacement motor-pump operates in the motor mode.

2. The hydraulic motor assembly of claim 1, wherein the bias spring regulates a pressure of hydraulic fluid in the pump conduit to a predetermined pressure when the variable displacement motor-pump operates in the pump mode.

3. The hydraulic motor assembly of claim 2, wherein the inlet conduit is the supply conduit, wherein the predetermined pressure is an offset pressure above a pressure of hydraulic fluid in the supply conduit, and wherein the offset pressure is proportional to the load exerted by the bias spring on the first face.

4. The hydraulic motor assembly of claim 2, wherein the inlet conduit is the return conduit, wherein the predetermined pressure is an offset pressure above a pressure of hydraulic fluid in the return conduit, and wherein the offset pressure is proportional to the load exerted by the bias spring on the first face.

5. The hydraulic motor assembly of claim 1, wherein the spool is further configured to control mixing of hydraulic fluid at a predetermined ratio of hydraulic fluid flowing from the supply conduit to hydraulic fluid flowing from the pump conduit when the variable displacement motor-pump operates in the pump mode.

6. The hydraulic motor assembly of claim 5, wherein the predetermined ratio is about one part hydraulic fluid flowing from the supply conduit to two parts hydraulic fluid flowing from the pump conduit.

7. The hydraulic motor assembly of claim 1, wherein the valve comprises a check valve.

8. The hydraulic motor assembly of claim 1, wherein the bias spring comprises a compression spring.

9. The hydraulic motor assembly of claim 1, wherein the bias spring is adjustable, and wherein adjusting the bias spring changes the load exerted on the first face.

10. A pump-motor relief valve for regulating a variable displacement motor-pump, comprising:
    a control chamber divided into an actuator chamber and a regulation chamber by a spool having a first face and a second face, the actuator chamber being in fluid communication with an inlet conduit and housing a bias spring configured to exert a load on the first face, the regulation chamber being in fluid communication with a pump conduit; and
    a mixing chamber being in fluid communication with a supply conduit, the pump conduit, and a return conduit and housing a portion of the spool, the spool separating the mixing chamber from the control chamber, wherein the spool is configured to control mixing of hydraulic fluid flowing from the supply conduit and the pump conduit through the mixing chamber into the return conduit when a variable displacement motor-pump operates in a pump mode, and wherein the spool is configured to prevent hydraulic fluid from flowing through the mixing chamber into the return conduit when the variable displacement motor-pump operates in a motor mode.

11. The pump-motor relief valve of claim 10, wherein the bias spring regulates a pressure of hydraulic fluid in the pump conduit to a predetermined pressure when the variable displacement motor-pump operates in the pump mode.

12. The pump-motor relief valve of claim 11, wherein the inlet conduit is the supply conduit, wherein the predetermined pressure is an offset pressure above a pressure of hydraulic fluid in the supply conduit, and wherein the offset pressure is proportional to the load exerted by the bias spring on the first face.

13. The pump-motor relief valve of claim 11, wherein the inlet conduit is the return conduit, wherein the predetermined pressure is an offset pressure above a pressure of hydraulic fluid in the return conduit, and wherein the offset pressure is proportional to the load exerted by the bias spring on the first face.

14. The pump-motor relief valve of claim 10, wherein the spool is further configured to control mixing of hydraulic fluid at a predetermined ratio of hydraulic fluid flowing from the supply conduit to hydraulic fluid flowing from the pump conduit when the variable displacement motor-pump operates in the pump mode.

15. The pump-motor relief valve of claim 14, wherein the predetermined ratio is about one part hydraulic fluid flowing from the supply conduit to two parts hydraulic fluid flowing from the pump conduit.

16. The pump-motor relief valve of claim 10, wherein the bias spring comprises a compression spring.

17. The pump-motor relief valve of claim 10, wherein the bias spring is adjustable, and wherein adjusting the bias spring changes the load exerted on the first face.

\* \* \* \* \*